Sept. 8, 1931.   G. L. TAYLOR   1,822,677
PHOTOGRAPHIC APPARATUS
Filed Feb. 10, 1927   11 Sheets-Sheet 1

*Fig. 1*

INVENTOR
George L Taylor
BY
*J. H. Simms*
his   ATTORNEY

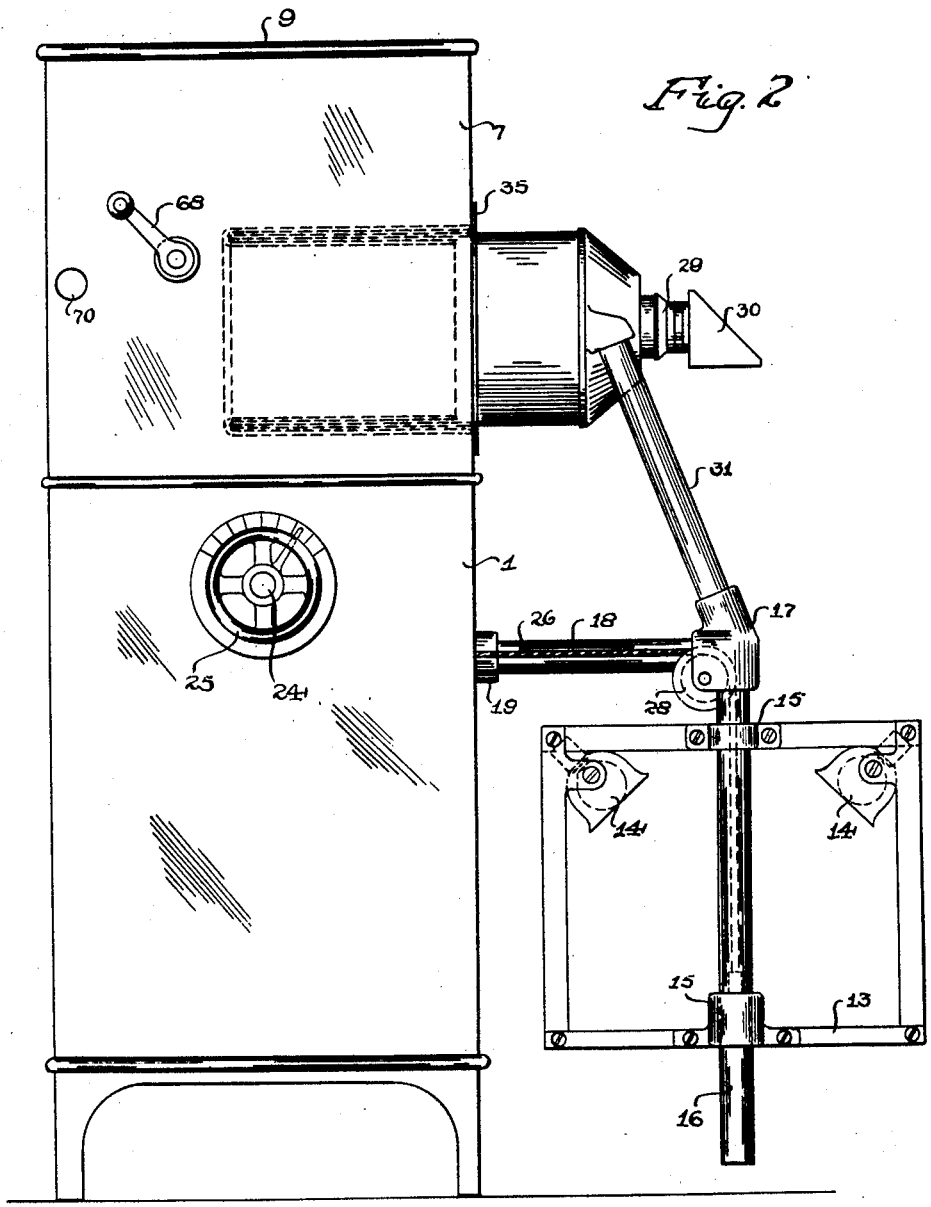

Sept. 8, 1931.　　　G. L. TAYLOR　　　1,822,677
PHOTOGRAPHIC APPARATUS
Filed Feb. 10, 1927　　　11 Sheets-Sheet 3
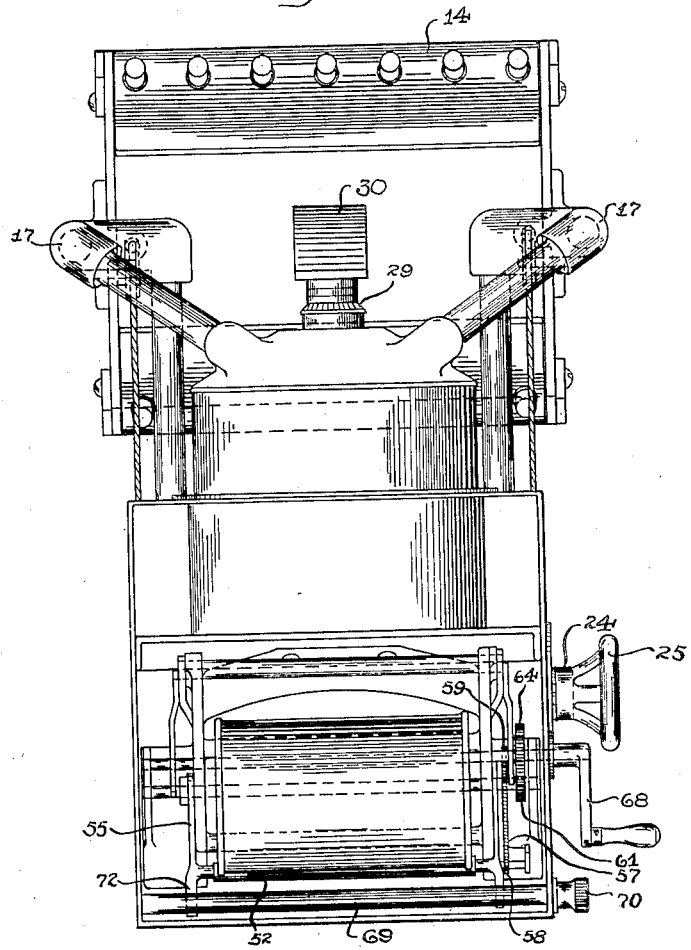
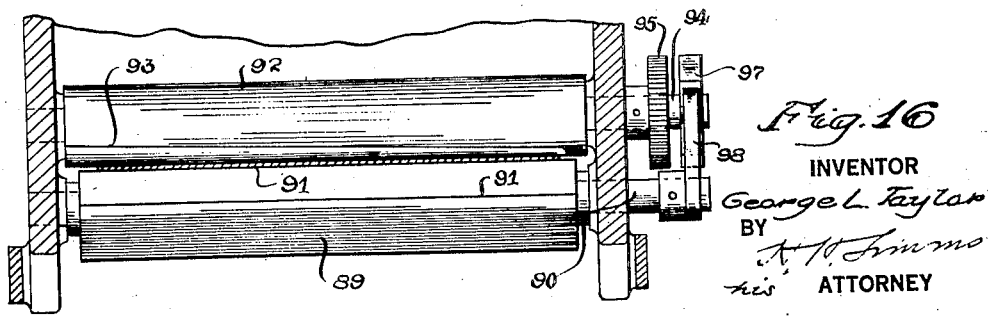
INVENTOR
George L. Taylor
BY
his ATTORNEY Sept. 8, 1931.  G. L. TAYLOR  1,822,677
PHOTOGRAPHIC APPARATUS
Filed Feb. 10, 1927   11 Sheets-Sheet 4

INVENTOR
George L. Taylor
BY
his ATTORNEY

Sept. 8, 1931.   G. L. TAYLOR   1,822,677
PHOTOGRAPHIC APPARATUS
Filed Feb. 10, 1927   11 Sheets-Sheet 5

Fig. 5

INVENTOR
George L. Taylor
BY
H. H. Simms
his ATTORNEY

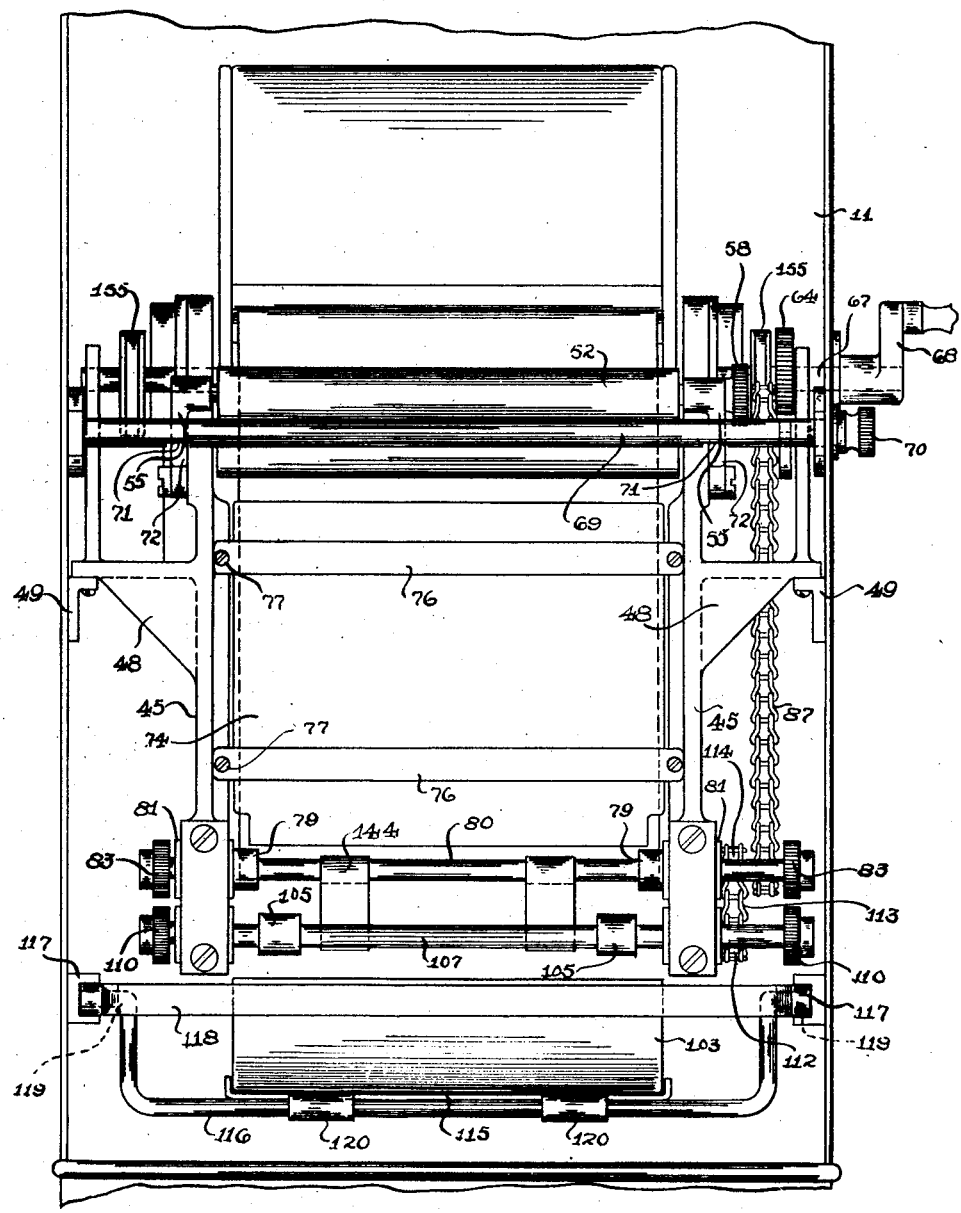

Sept. 8, 1931. G. L. TAYLOR 1,822,677
PHOTOGRAPHIC APPARATUS
Filed Feb. 10, 1927 11 Sheets-Sheet 7
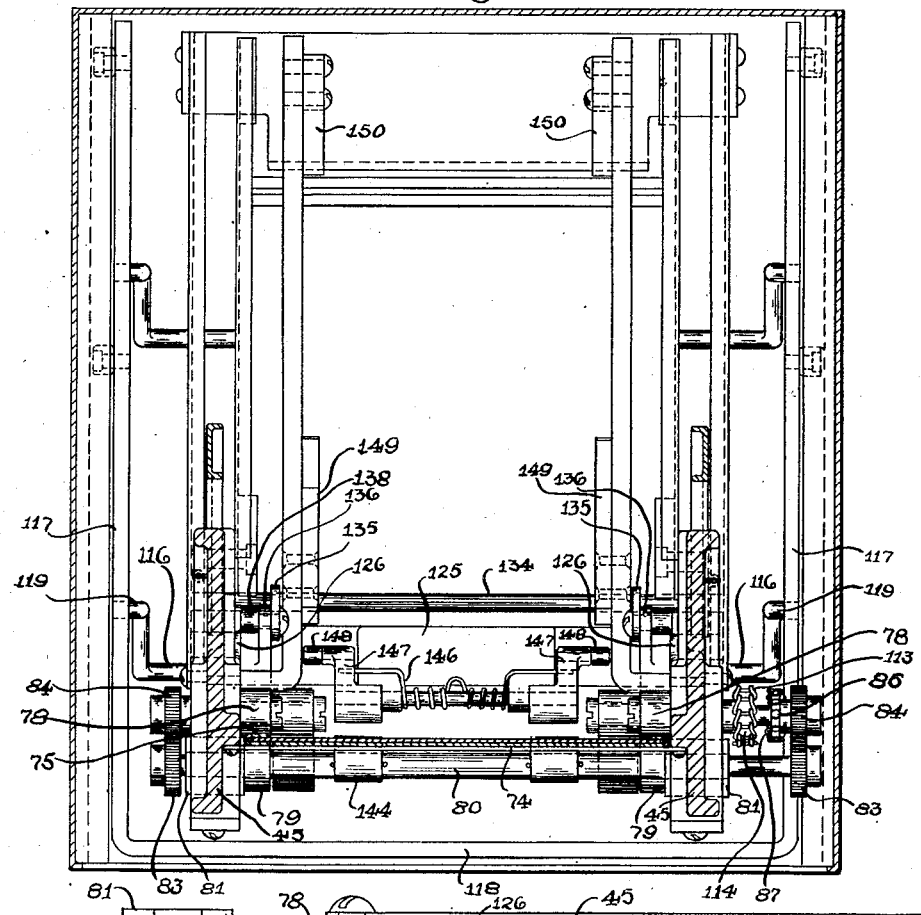
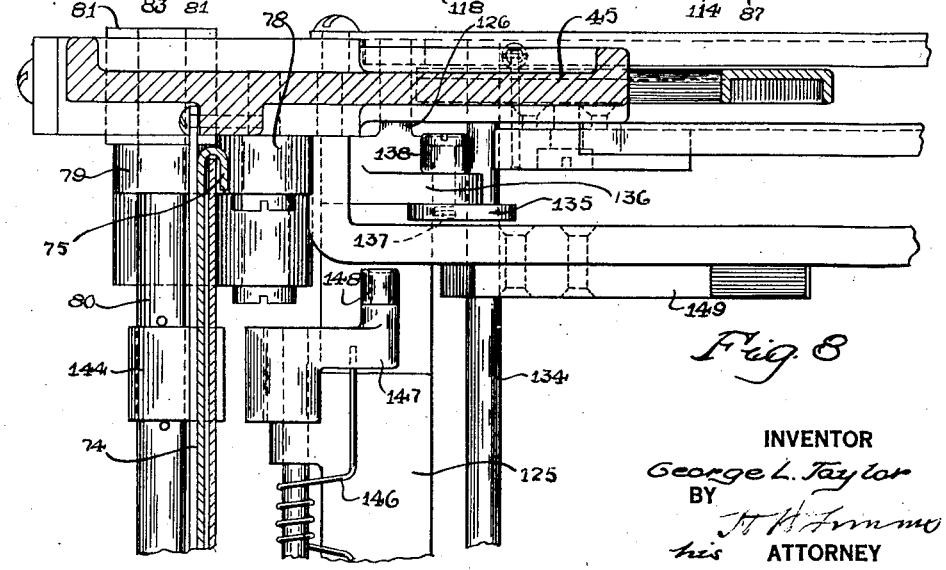
INVENTOR
George L. Taylor
BY
his ATTORNEY Sept. 8, 1931.     G. L. TAYLOR     1,822,677
PHOTOGRAPHIC APPARATUS Filed Feb. 10, 1927     11 Sheets-Sheet 8

INVENTOR
George L. Taylor
BY
his ATTORNEY

Sept. 8, 1931. G. L. TAYLOR 1,822,677
PHOTOGRAPHIC APPARATUS
Filed Feb. 10, 1927 11 Sheets-Sheet 9

INVENTOR
George L. Taylor
BY
H. K. Simms
his ATTORNEY

Sept. 8, 1931.  G. L. TAYLOR  1,822,677
PHOTOGRAPHIC APPARATUS
Filed Feb. 10, 1927  11 Sheets-Sheet 10

INVENTOR
George L. Taylor
BY
his ATTORNEY

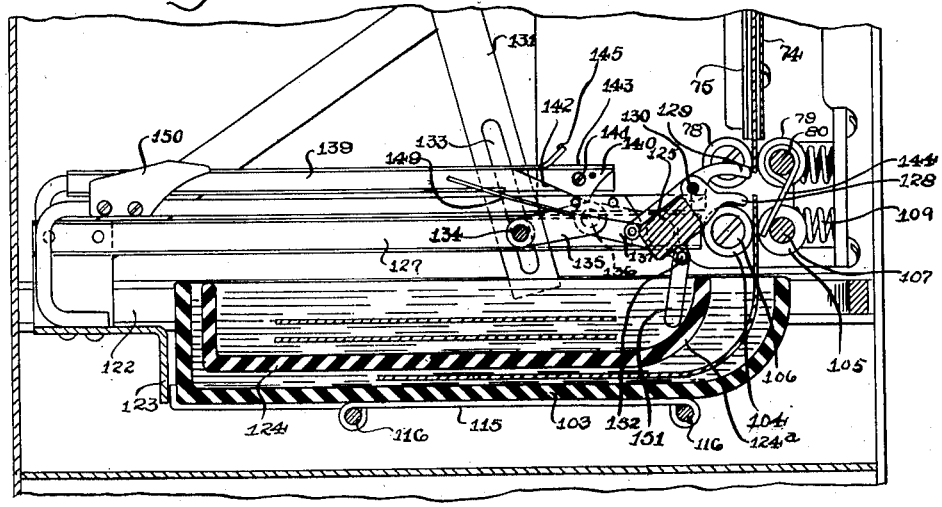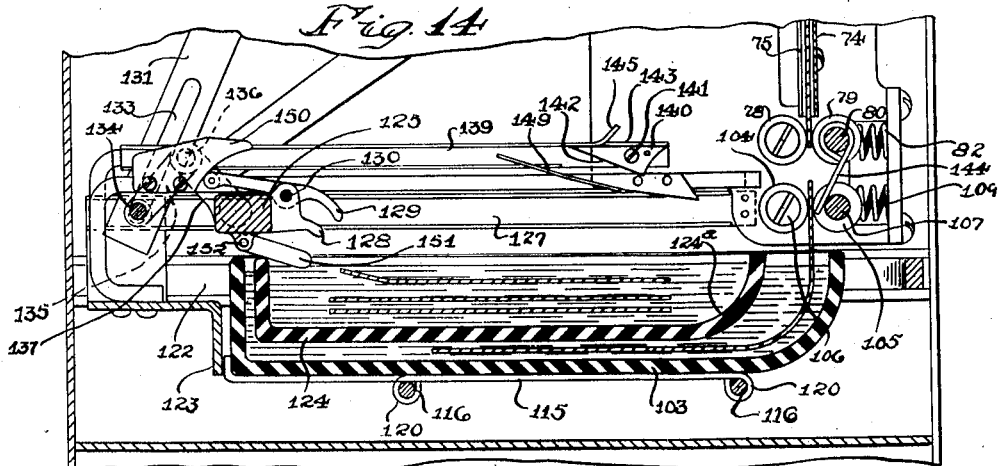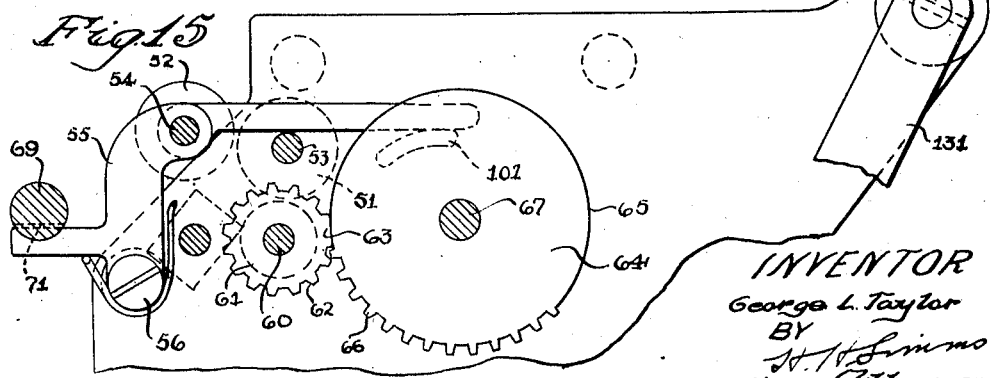

Patented Sept. 8, 1931

1,822,677

UNITED STATES PATENT OFFICE

GEORGE L. TAYLOR, OF ROCHESTER, NEW YORK, ASSIGNOR, BY MESNE ASSIGNMENTS, TO HAROLD GOUINLOCK, OF BATAVIA, NEW YORK

PHOTOGRAPHIC APPARATUS

Application filed February 10, 1927. Serial No. 167,270.

The present invention relates to photographic apparatus. One object of the invention is to improve that type of photographic apparatus in which a sensitized strip preferably in roll form is fed to exposure position, the exposed portion being thereafter carried to a developing bath and finally to a fixing bath, provision being made for severing each exposed portion from the strip at some point during the movement of the strip through the machine. Another object of this invention is to provide a construction in which the sensitized sheet from the time it leaves the roll until it is removed from the fixing bath operates entirely within the exposure chamber. Still another object of the invention is to provide for the mounting of the severing means above the exposure position in order that the portion at exposure position may be moved in advance of the main portion of the strip and at the same time the cutting mechanism will be situated at a point where it will not be affected by the chemicals used in developing and fixing the print. Still another object of the invention is to provide two feeding mechanisms for the sensitized material, one located above and the other below exposure position, with a severing mechanism also situated above exposure position, provision being made for rendering the operation of the feeding mechanism above exposure position inoperative during the severing of the sheet so that the feeding mechanism below exposure position may advance the severed portion ahead of the main portion of the strip. Still another object of the invention is to provide two pairs of feeding devices between the exposure position and the developing bath, one of said feeding devices moving the sensitized sheet from the exposure position and the other of said feeding devices holding the sheet while in the developing bath. A transfer means removes the sheet from last named feeding devices and carries it to a fixing bath. Still another object of the invention is to provide a common controller which effects the severing of a previously exposed portion and the feeding of the latter to the developing bath, and during the feeding of an exposed sheet to the developing bath, effecting the feeding of an unexposed portion to exposure position and a previously exposed portion from the developing bath to the fixing bath. Still another object of the invention is to provide a transfer mechanism which will move a sheet from a developing bath to a fixing bath and which takes hold of the sheet while the latter is in the developing bath. Still another object of the invention is to provide a novel transfer mechanism for moving a developed sheet into a fixing bath. Still another object of the invention is to provide a novel form of submerger which acts on the sheets in the fixing bath to submerge them in the bath. Still another object of the invention is to provide a novel means for mounting the developing bath and the fixing bath in the exposure chamber, whereby they may be effectively brought into and out of cooperation with the mechanisms functioning therewith. Still another object of the invention is to provide a connection between the lens carrier and the exposure chamber casing which will permit the adjustment of the lens carrier for focusing, provide a light locked arrangement and do away with the more expensive bellows construction heretofore used for this purpose. A still further object of the invention is to provide a construction which is adapted to receive and hold a light locked roll chamber in which a roll of sensitized sheet material is enclosed and which is the container for the roll when the latter is shipped from the factory.

To these and other ends, the invention consists of certain parts and combinations of parts, all of which will be hereinafter described, t..e novel features being pointed out in the appended claims.

In the drawings:

Fig. 1 is a front elevation of a machine constructed in accordance with this invention.

Fig. 2 is a view of the machine in side elevation

Fig. 3 is a plan of the machine with the cover removed.

Fig. 5 shows interior parts in the exposure chamber in side elevation.

Fig. 6 shows interior parts in the exposure chamber in rear elevation.

Fig. 7 is a section on the line a—a, Fig. 5.

Fig. 8 is an enlarged fragmentary section on the same line.

Fig. 13 is a fragmentary sectional view showing the gripping jaws on the transfer mechanism as they are about to engage the upper edge of an exposed sheet.

Fig. 14 is a similar view showing the position of the gripping jaws shortly after they have deposited a sheet in the fixing bath;

Fig. 15 is a detail view of the severing or cutting mechanism; and

Fig. 16 is a fragmentary horizontal view showing the cutting mechanism.

Figure 4:
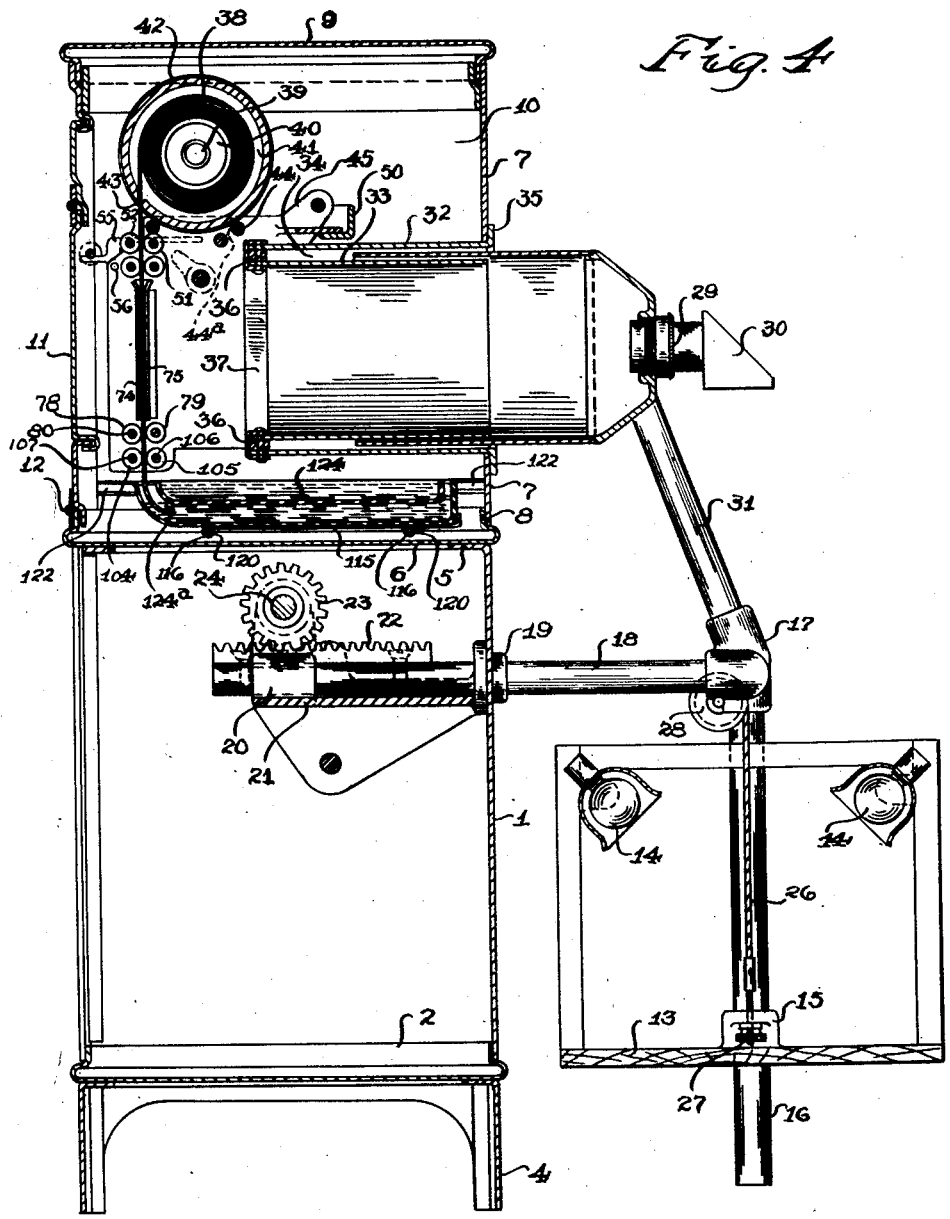
Fig. 4 is a central vertical section of the machine.
Figure 9:
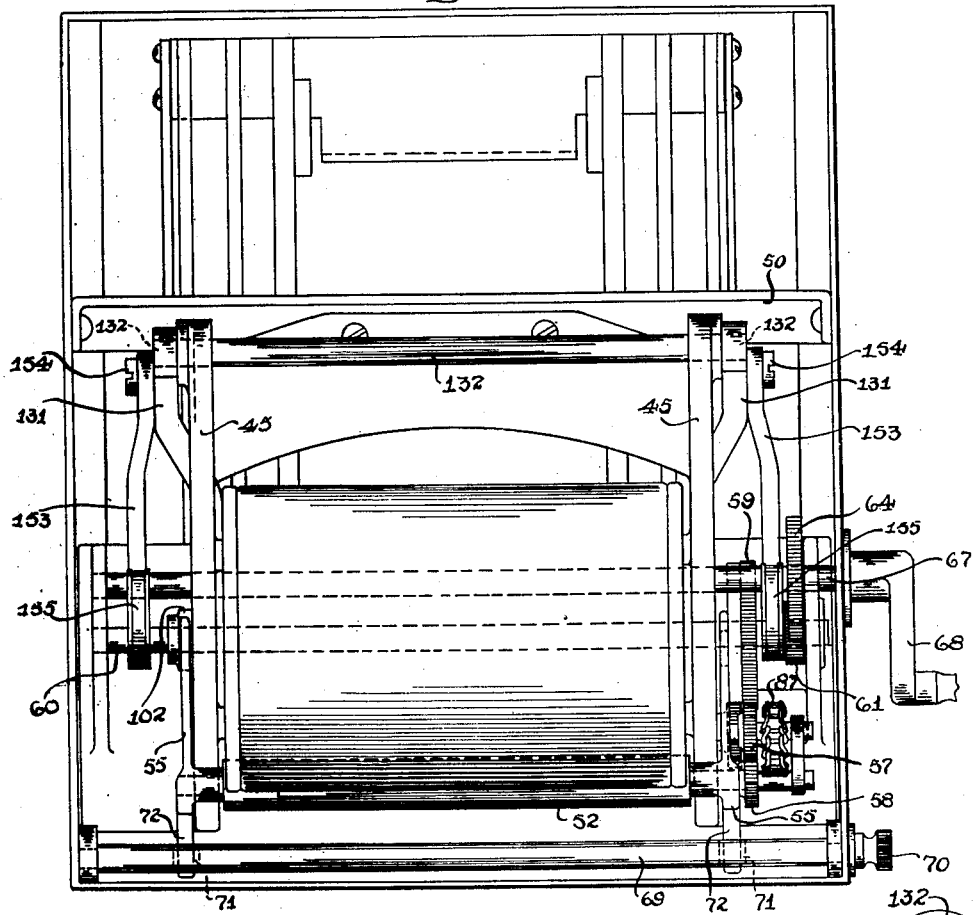
Fig. 9 shows interior parts in the exposure chamber in plan.

In the illustrated embodiment of the invention there is employed a base comprising, in this instance, a rectangular tubular member 1 fitted at its lower end over an angular flange 2 on a bottom member 3 which is supported in an elevated position by supporting means 4. The upper end of the tubular member is turned inwardly at 5 and a partition 6 is supported on the inwardly turned portion being welded or otherwise secured thereto. A second rectangular tubular casing 7 is fitted about the flange 8 of the partition 6 and projects upwardly from such partition. A flange top piece 9 fits in the upper end of a tubular casing 7 and forms a closure for said casing. This upper casing 7 forms an exposure chamber 10. A closure 11 hinged at 12 permits access to the rear of the chamber 10.

The matter to be photographed rests, in this instance, upon a work support 13 on a frame which carries illuminating means 14 disposed above the work support. This frame has guides 15 at opposite sides which, in this instance, operate on vertical guide rods 16 depending from coupling member 17, the coupling members are supported by horizontal guide rods 18 which are guided at 19 and 20 on the base of the apparatus, the guides 19 being supported by the front wall of the casing 1 and the guides 20 being supported on a cross piece 21 within the casing 1.

The guides 18 are each provided with a rack bar 22 with which mesh pinions 23 on a shaft 24 this shaft being operated by a shaft wheel 25 on the exterior of the casing 1. The turning of this shaft 24 moves the guide rods 18 on the guides 19 and 20 to move the work support 13 toward and from the casing. At the same time, through a means not shown in this application and forming the subject matter of a separate application, the work support is moved on the guide 16, this being effected through cables 26 adjustably connected at 27 to the work support, extending upwardly therefrom about pulleys 28 on the coupling members 17 and rearwardly from said pulleys into the casing 1 where they are operatively connected with the shaft 24 so that the rotation of such shaft in one direction effects the raising of the work support 13 on the guides 16 and the rotation of the shaft in the other direction effects the lowering of the work support on the guides 16.

One of the functions of the chamber 10 is to act as an exposure chamber and to this end there is provided a lens mounting 29, in this instance, arranged at the outer end of a sleeve 30 which, is supported to move with the guides 16 and 18 so that a reflector 20 may maintain optical relation between the work support 13 and the lens in the lens mounting 29, the couplings 17 have connected thereto supporting rods 31 which extend upwardly and inwardly from said coupling members and connect with the front or outer end member of the sliding sleeve 30. It is thus apparent that the adjustment of the sleeve 30 to effect the focusing of the apparatus is effected through the shaft 24 which also effects the movement of the work toward and from the lens and also shifts the work toward or from the main casing with the movement of the lens carrier toward or from the main casing.

The adjustable sleeve 30 has a connection with the exposure chamber which eliminates all possibilities of pin holes, does away with the old form of bellows, and a light locked connection with the exposure chamber making it possible to provide an inexpensive construction. In this instance two tubular members 32 and 33 are arranged one within the other in spaced relation to form a chamber 34 between them. The outer most member 32 has an outward extending flange 35 which is secured to the outer face of the casing member 7 about an opening through which the two sleeve members 32 and 33 project. The inner ends of the sleeve or tubular members 32 and 33 are secured to opposite faces of a ring 36 to space the two sleeves 32 and 33 apart while a ring 37 channeled on one side fits over the inner ends of both sleeves 32 and 33 and provides a light locked connection between the inner ends of the two sleeves. The sleeve 30 which is supported by an adjustable frame comprising the guide 16, guides 18, couplings 17 and supporting rods 31, operates in the chamber 34 out of contact with the walls of the two sleeves 32 and 33, but the latter provide a light lock connection between the sleeve 30 and the casing of the exposure chamber.

The sensitized material is introduced into the exposure chamber in the form of a roll 38 which is supported rotatably on bearings 39 which fit in filler pieces 40 introduced at the center of the roll. The bearings 39 project inwardly from the opposite heads 41 of a drum or cylindrical casing or tube 42 which encloses the roll 38, this drum or container having a light excluding slot 43 in the cylindrical wall thereof through which the sensitized sheet may be withdrawn from the drum. By the provision of this drum it is possible to skip or transport the sensitized sheets in roll form to the user in a container which may be inserted in the apparatus without any danger of accidental exposure. An edge of the sheet projects from the light locked opening and may be readily drawn out by hand to connect with the operating parts of the apparatus. The apparatus is constructed to hold the drum or container against movement in a position to cooperate with the feeding mechanism of the apparatus.

In this instance, the drum is supported in the exposure chamber 10 on two rods 44 spaced apart and connecting two side frames 45 arranged within the exposure chamber 10. One of these rods has a projection 44ᵃ adapted to pass through an opening 44ᵇ in a chime 47 of the container to hold the container against turning of the rods. The side frames 45 carry spring clips 46 which engage over the chimes 47 at the opposite ends of the container 2 and hold said container on the supporting rod 44. The side frames 45 have brackets 48 projected from opposite sides thereof and resting upon brackets 49 on the sidewalls of the exposure chamber 11. These side frames also project forwardly at their upper ends and rest upon a cross piece 50 connecting the side walls above the two tubes 32 and 33.

The feeding of the sensitized material may be effected in any suitable manner, in this instance, two rollers 51 and 52 are provided adjacent the upper portions of the side frames 45 below the outlet opening 43 of the drum 42. Both rollers are, in this instance, rubber or composition faced to make them yielding and the roller 51 has its shaft 53 journalled in the side frames 45, whereas the roller 52 has its shaft 54 journalled in two arms 55 which are pivoted at 56 to the side frames 45, permitting said roller 52 to move toward and from the roller 51. Intermeshing gears 57 and 58 arranged respectively on the shafts 53 and 54, cause the shafts 53 and 54 to turn in opposite directions while making the adjacent or cooperating portions of the two feed rollers 51 and 52 move in the same direction.

Figure 10:
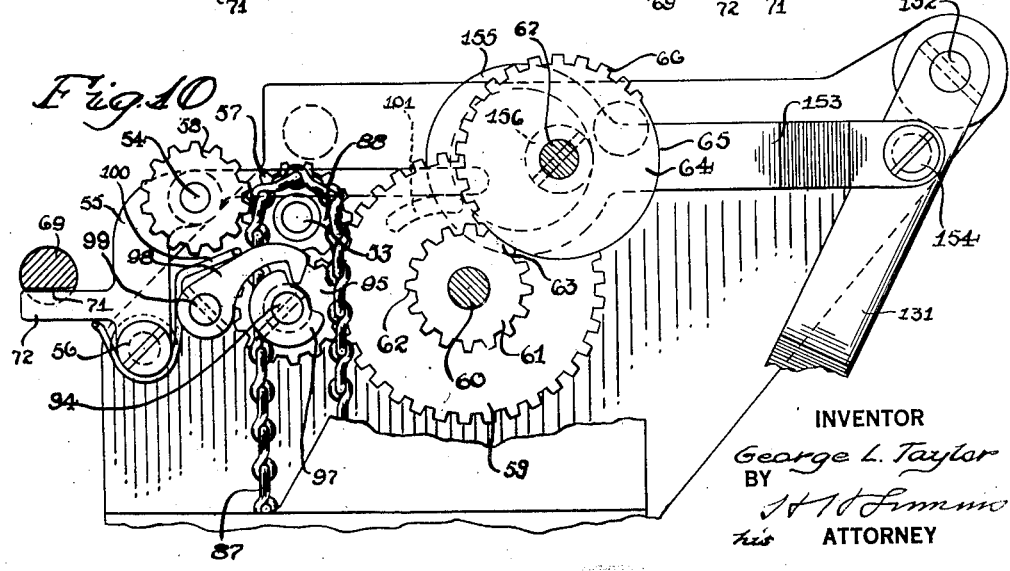
Fig. 10 is an enlarged fragmentary view showing the connection between the common operating shaft and the different mechanisms of the machine.

With the end in view of having these feed rollers on each operation feed a measured amount of material to exposure position, an operating means is provided comprising, in this instance, a gear 59 meshing with the gear 57 and having on its shaft at 60 a mutilated gear 61, the greater portion of the periphery of which is provided with teeth 62 while the smaller portion has a concave seat 63. For cooperating with this mutilated gear 61 a mutilated gear 64 is provided which has teeth 66 on a portion of its periphery and a cylindrical portion 65 on the other portion of the periphery concentric with the axis of turning of the mutilated gear 64. This gear 64 may be driven in any suitable manner and to this end is mounted on the shaft 67 which has a crank arm 68 thereon to which the shaft 67 is turned. With the turning of the shaft, assuming that the parts are shown in Fig. 10, the teeth 65 cooperate with the teeth 62 and turn the shaft 60 substantially one complete revolution, after which the concentric portion 66 cooperates with the concave portion 63 and the shaft 67 continues its turn so as to perform other functions as will be herein after set forth.

With the end in view of moving the roller 52 away from the roller 53 in order that a portion of the sheet material may be fed from the containers by hand to a position between the rollers or that the machine may be operated independently of the feed roll to feed the exposed pieces through the developing and the fixing bath, there is employed a rotary rod 69 which is journalled in the side walls of the exposure chamber and extends at one end to the exterior of the chamber where it is provided with a knurled operating wheel 70 through which said rotary shaft or rod 69 may be turned. This rod has two notches or grooves 71 extending transversely thereof and in these grooves arms 72 which project from the swinging arms 55 lie when the roller 52 cooperates with the roller 51. However, the shafts if the 69 is rotated through the knurled wheel 70, then these arms 72 will be engaged by portions of the shafts 69 farther from the axis of turning of said shafts, thus swinging the arms 55 on their pivots 56 against the action of springs 73 which normally tend to hold said roller 52 toward the roller 51.

The feeding rollers feed the sheet of sensitized material to a holder which maintains this sheet in a substantially flat condition at exposure position. This holder in this instance, is in the form of a vertically arranged plate 74 with overhanging flanges 75 at opposite edges providing guides for the opposite edges of the sheet, these guides being substantially vertically below the point of contact between the feed rollers 51 and 52. In this instance, this plate or holder is supported by cross pieces 76 which are bolted at 77 to the side frame 45.

After passing over the holding plate 74 the edge of the sheet passes between the members of two pairs of short rollers 78 and 79 so that the sheet is gripped at opposite sides at a point below the holder 74. The rollers 79 are mounted on a common shaft 80, the opposite ends of which are journalled in blocks 81 slidable on the side frames 45 and acted upon by springs 82 which move the rollers 79 toward operative engagement with the roller 78. This shaft 80 has at opposite ends gears 83 which mesh with the gears 84 on the stub shafts 85 of the rollers 78. The diameters of the rollers 78 and 79 are substantially equal to the diameters of the rollers 51 and 52 and their peripheral speeds are the same so that the feeding rollers above the holder at exposure position and the feeding rollers below the holder at exposure position can operate upon the sheet simultaneously. The driving of the lower rollers is effected in this instance by a sprocket wheel 86 on one of the stub shafts 85 engaged by a sprocket chain 87 which also passes about a sprocket wheel 88 on the shaft 53 of the roller 51.

While the exposure is taking place, the piece of the sheet at exposure position is held at a taut condition by the lower feed rollers 78 and 79. Immediately after the exposure, the crank handle 68 is turned and the severing of the paper takes place. Any suitable severing means may be employed. It is preferred however to use one which when not in operation to effect the severing will permit the free movement of the sensitized sheet to exposure position without interference by the severing means. The one herein shown forms the subject matter of a separate application and comprises an oscillatory knife 89 mounted on a shaft 90 and having a cutting edge 91 arranged eccentrically to the axis of turning of the shaft, so that said cutting edge may be moved toward and from the path of travel of the sensitized sheet. For cooperating with this oscillatory cutter there is employed a rotary cutter 92 having a helical cutting edge 93 which has portions thereof successively presented to the cutting edge 91 in order to sever the exposed portion of the sheet from the unexposed portion. In this instance, the shaft 94 of the rotary cutter 92 has a gear wheel 95 thereon which meshes with a gear 96 on the shaft 60 so that during the rotation of the feed rollers 51 and 52 the cutter 92 is rotating. However, it is not desired that the cutter 92 shall cut with each rotation thereof, so the cutter 89 is held out of cooperation with the cutter 92 except for a short period of time, when the rollers 51 and 52 are out of cooperation and the sensitized sheet is not moving. This is effected in this instance by providing on the shaft 94 a cam 97 adapted to cooperate with an arm 98 on a shaft 90 of the oscillating cutter 89, a spring 100 acting on the arm 98 in the direction to hold the arm 98 in cooperation with the cam 97. The arm 98 drops into the low part of the cam 97 about the time that the rollers 78 and 79 take hold of the lower edge of the sensitized sheet and about which time the rollers 51 and 52 are separated in a manner to be described. After the severing of the exposed portion of the sheet from the main portion the arm 98 cooperates with the high point of the cam 97 and moves the cutting edge 91 out of cooperation with the rotary cutter 92, and, about the same time, the rollers 51 and 52 are brought into cooperation with the unexposed portion of the sensitized sheet to again feed an unexposed portion to exposure position. The movement of the roller 52 toward and from the roller 51 may be effected automatically through two cams 101 and 102 mounted on the shaft 60 and cooperating with the forward portions of the swinging arms or members 55 so as to move said arms or members on their pivots 56 in order to carry the rollers 52 away from the roller 51 just before the severing or cutting operation takes place so that the severing takes place while the sheet is stationary. Furthermore the separation of the upper pair of feed rolls permits the lower feed rolls 78 and 79 to act on the severed sheet while the unsevered portion is stationary so that a separation between the severed piece in the roll takes place.

The lower rolls carry the severed sheet into a developing receptacle or tray 103 supported in the exposure chamber in a manner to be described. In this movement of the severed sheet, the roll 78 and 79 are assisted by rolls 104 and 105. The rolls 104 being mounted on stub shafts 106 below the roll 78 to engage the front face of the sensitized sheet adjacent opposite side edges, while the rolls 105 are mounted on a shaft 107 to operate on the rear face of the sensitized sheet on opposite vertical edges thereof and below the roll 79. The shaft 107 is supported in a carrier block 108 which is guided horizontally on the frame pieces 45 and acted upon by springs 109 which hold the rollers 105 toward the rollers 104. Pinions 110 on opposite ends of the shaft 107 mesh with pinions 111 on the stub shafts 106, and, on one of the stub shafts 106, a sprocket wheel 112 is arranged which by a sprocket chain 113 connects with a sprocket wheel 114 on one of the stub shafts 85, so that the driving of the stub shaft 85 by the sprocket chain 87 drives the stub shaft 106 which in turn drives the shaft 107, and the latter, through the gears 110 at the opposite ends, drives the other stub shaft 106.

With this arrangement, both pairs of rollers 104 and 105 travel at the same periphery speed as both pairs of rollers 78 and 79 and both pairs of sleeve rollers 51 and 52, whereby the sheet moves at a uniform speed from its roll to the developing tray.

The developing tray 103 hereinbefore mentioned rests upon a supporting bed or plate 115 which by two or more U-shaped supports or hangers 116 is suspended from a carriage 117. This carriage has two parallel sides 117 connected at one end by a transverse member 118 and the U shaped hangers 116 have their ends 119 journalled in the sides 117 while their central portions extend beneath the support 115 and are pivotally connected to said support at 120. The carriage sides 117 are provided with rollers 121 which are adapted to travel in horizontal guides or ways 122 arranged on opposite sides of the exposure chamber near the bottom of the latter. The support 115 is movably supported on the carriage in order that said support may be elevated when the carriage is moved to its inner most position and lowered when the carriage is moved away from its innermost position. This result is effected by providing a stop 123 arranged in the path of the support 115 so that after the developing tray has reached its desired inner position with the support 115 against the stop 123, the further movement of the carriage 117 and 118 will shift the upper ends of the hangers 116 from their normal position above the pivotal connections 120 and cause the support 115 to be elevated. With the outward movement of the carriage 117 and 118 the hangers 116 will again be moved before the support 15 and as a consequence the support 115 will lower.

Within the developing tray 103 is positioned a fixing tray 124. The upper edges of the two trays 103 and 124 are substantially in the same horizontal plane, and at one side the two trays have their side walls curved on substantially parallel lines and spaced apart so that the exposed severed sensitized sheet may be passed into the developing tray 103 and below the fixing tray 124 as illustrated in Figs. 13 and 14, this space occuring vertically below the discharging surfaces of feed rollers 104 and 105 so that the severed exposed sheet may be fed by said rollers into the developing bath. The wall of the fixing tray on one side of this opening is flanged at 124ª on opposite sides so as to provide anti splash guards to prevent the liquid from one tray splashing into the other.

It will be noted that the developing tray and the fixing tray have their rear ends substantially beneath the exposure position for the sensitized material, and said trays are projected forwardly from the exposure position and lies beneath that portion of the camera between the lens and the exposure position. This arrangement makes it possible to form a more compact structure, in that the developing and the fixing bath as well as the operating parts are situated between the lens and the exposure position for the sensitized portion.

With the end in view of removing the exposed severed sheet from the developing bath and transferring it to the fixing bath, a novel transfer mechanism is employed. This transfer mechanism in this instance takes hold of the edge of the severed exposed sheet after the latter has passed from the rollers 78 and 79 and before it is released by the rollers 104 and 105. It comprises a traveler 125 which has bearings 126 at opposite ends mounted to travel in and turn on horizontal guides or ways 127. This traveler has fixed jaws 128 formed thereon and adapted to cooperate with movable jaws 129 pivoted at 130 to the traveler. While an exposure is taking place the jaws 128 and 129 are gripping one edge of an exposed severed sheet situated in the developing tray 102. As the next exposed portion is cut and fed into the developing tray, the traveler 125 moves away from the feeding mechanism and draws the sheet previously deposited in the development tray into the fixing tray, over the wall of the fixing tray which through its outer flange 124ª wipes off the surplus liquid. The last mentioned sheet is finally released in the fixing tray and the traveler then moves forwardly to engage the upper edge of the next sheet feed to the developing bath. This movement of the transfer traveller takes place with each operation of the machine.

Figure 11:
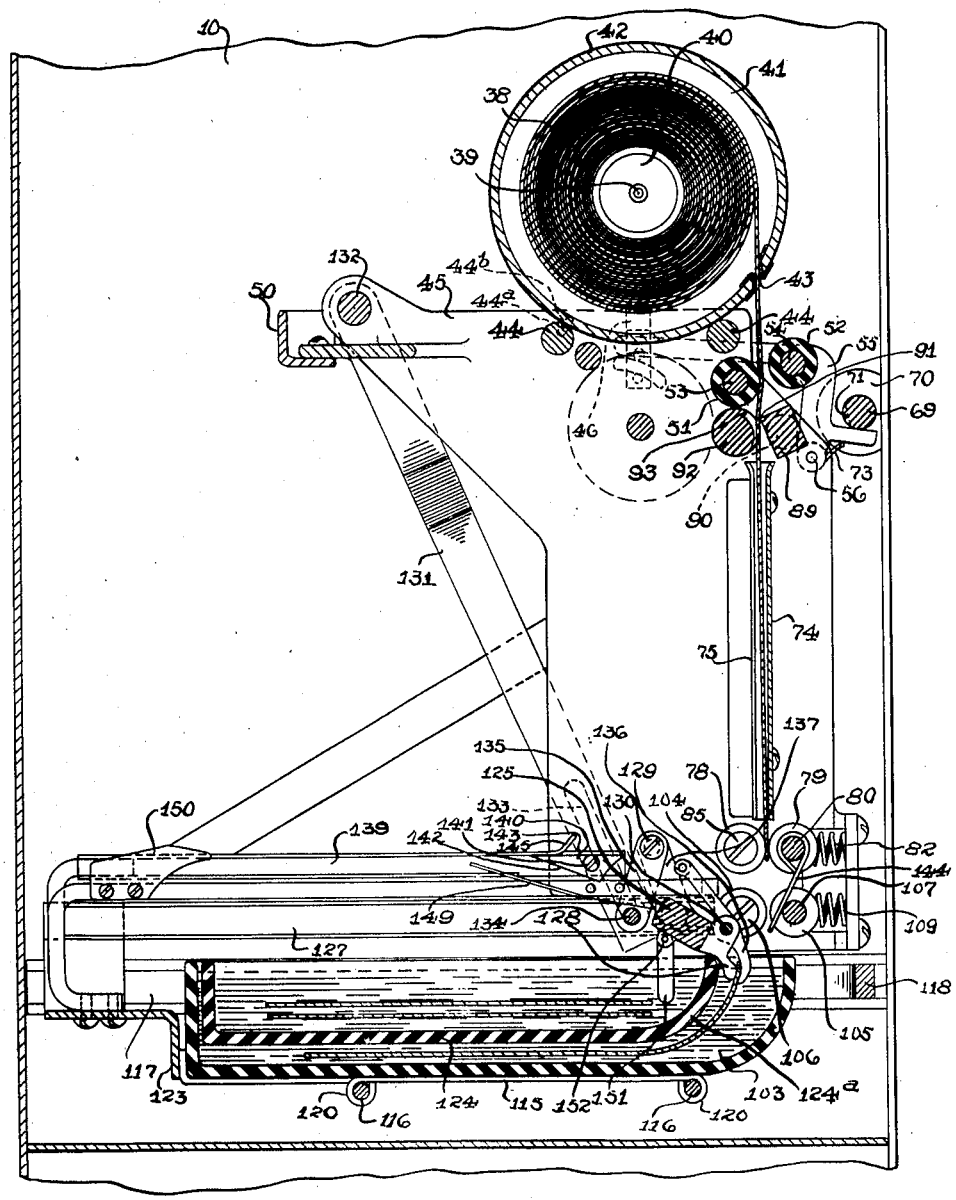
Fig. 11 is an enlarged vertical central section through the exposure chamber showing the positions the parts occupy when the machine is ready for making an exposure.
Figure 12:
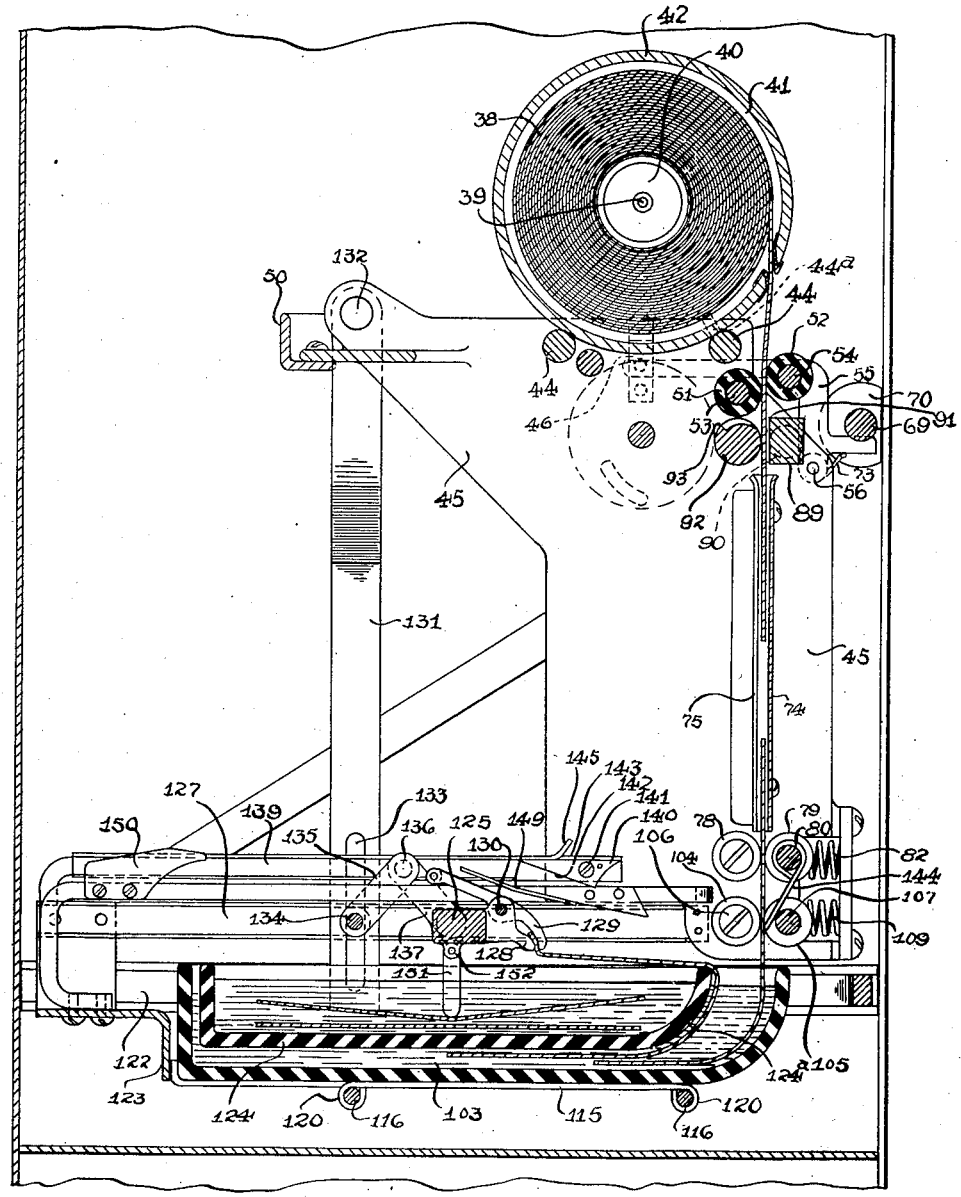
Fig. 12 is a similar view showing the parts in positions which they occupy during the feeding of an exposed piece to the developing bath, an unexposed portion of the sensitized material to exposure position and a developed piece to the fixing bath.

The means for effecting the movement of the traveler of the transfer mechanism may be of any suitable construction. In this instance, there is employed a swinging frame 131 pivotally supported by a shaft 132 which connects the side frames 45 and having two arms depending therefrom each formed with the slot 133. In these slots 133 of the two arms works a rod or bar 134 which is guided at its ends in the guide 127 and is provided with two arms 135 each of which is pivoted at 136 to an arm 137 rigidly secured to the traveller 125. At the pivot of each toggle formed by the arms 135 and 137, a roller 138 is provided. These rollers are adapted to travel back and forth on track 139 adjacent the feeding devices at the lower end of the guide 74. For the sensitized sheet is provided a switch member 140, pivoted at 141 and having two guiding surfaces 142 and 143. When the traveler 125 moves back and forth on the guide 127 the jaws 128 and 129 project slightly below the plane of the guide 127 while the toggles have their members 135 and 137 substantially at right angles to each other, but as the traveler 125 approaches the lower feeding devices, the rollers 138 will engage the trackways 142 and as a consequence while the rollers 138 are traveling on these trackways 142, the toggles formed by the members 135 and 137 will be straightened and this will effect a swinging of the jaws 128 and 129 upwardly to the position illustrated in Fig. 13. After the rollers 138 pass off the trackways 142, the toggles are again broken due to the fact that the swinging frame 131 is pushing on the rod 134 and nothing interferes with the upward movements of the knuckles of the toggles. As a result the jaws 128 and 129 swing downwardly to the position illustrated in Fig. 11, and with this swinging the movable jaw moves toward a fixed jaw 128 and grips the upper edge of that portion of the severed exposed sheet held by the rollers 104 and 105. At the same time, the jaws engage with swinging members 144 mounted on the shaft 80 and engaging the shafts 107. The engagement between the gripping members and the swinging members 144 effects the movement of the shaft 107 against the action of its spring 109 so as to free the severed exposed sheet from engagement by the rollers 104 and 105 permitting the gripping devices on the traveler to carry the sheet still further into the developing bath. On the return movement of the traveler 125, the rollers 138 engage the upper tracks 143 of the switch members 140 and travel along said tracks 143 until the rollers strike rigid switch portions 145 which deflect the rollers downwardly shifting the switches 140 on their pivots 141, and thus causing the gripping means of the traveler to move again in a horizontal plane. Spring means 146 acts on the movable clamping jaws 129 normally to hold said clamping jaws toward the fixed clamping jaws 128. These clamping jaws 129 each have an arm 147 extending rearwardly therefrom and provided with a laterally extending roller 148. These rollers are adapted to cooperate with camming devices 149 as the traveler 125 moves toward the lower feeding rolls so as to effect the opening of the jaws as shown in Fig. 13. When the rollers 148 pass off these camming devices 149, the spring means 146 move the jaws 129 toward the jaws 128 and clamps the upper edge of the exposed sensitized sheet last fed into the developing receptacle. On the return movement of the traveler 125 the rollers 148 pass above the camming devices so that the sheet is held by the gripping devices on the traveler while the latter is transferring the sheet from the developing bath to the fixing bath. About the time that the traveler 125 has reached the end of its movement over the fixing bath the rollers 148 cooperate with camming devices 150 and the jaws 129 are moved away from the jaws 128, thus releasing the sensitized sheet in the fixing bath.

In order to provide for the submerging of the sheets in the fixing bath, a submerging device is employed, in this instance, in the form of a member 151 which is pivotally suspended at 152 from the under side of the traveler 125 so as to cooperate with the sensitized material in the fixing bath as the traveler moves back and forth over said bath.

Movement of the swinging frame 131 may be effected in any suitable manner. In this instance, to each arm of the swinging frame 131 a link 153 is pivoted at 154. This link has a ring 155 formed at the opposite end thereof and surrounding an eccentric 156 on the shaft 67. In this way, the movement of the transfer device is effected through the movement of the crank 68 which also effects the movement of the sensitized sheet from the roll to exposure position and to the developing bath as well as the movement of the severing devices which separate the exposed portions of the sheet from the roll.

The operation of the invention will be understood from the foregoing description but it may be summarized as follows:

A roll of sensitized material within the carton or container is placed upon the supporting rods 44 and is held thereto by the clips 46. The knurled wheel is turned to separate the feed rollers 51 and 52 so that a portion of the sensitizing sheet may be fed by hand between the upper feed rollers and the cutters after which the turning of the knurled wheel in the opposite direction brings the rollers 51 and 52 into cooperation. The machine casing is then closed and an exposure taken after the proper adjustment of the work support 13 and the proper focusing of the camera. The parts in the interior of the machine at the time of the exposure occupy the position shown in Fig. 11. With the turning of the crank handle 68, the cutting mechanism formed by the cutters 89 and 92 cuts off the exposed portion of the sensitized material, and, at the same time, the rollers 78 and 79 pick up the severed portion and feed the same to the rollers 104 and 105. A short period after the severing the rollers 51 and 52 are brought into cooperation and feed another portion of the sensitized material to the exposure position. The lower feeding rollers 85, 79 and 104 and 105 continue their feeding action until the severed exposed sheet occupies the position shown in Fig. 14 with its upper edge held by the rollers 104 and 105 while the feeding rollers 51 and 52 continue their feeding action until the lower edge of the unexposed portion is engaged by the feeding rollers 78 and 79. As the severed sheet is moved by the rollers 78, the previously severed sheet which is held by the gripping jaws 120 and 129, is carried by the traveller 125 out of the developing bath 103 over and in contact with the edge of the fixing tray and into the fixing bath 124, the jaws 128 and 129 releasing the sheet into the bath when the traveller reaches the end of its movement in such direction. The traveller 125 then begins its movement in the other direction, and, just before it approaches the lower feeding devices 104 and 105, the gripping means 128 and 129 open and the traveller is tilted so that it lies above the upper edge of the sheet held by the rolls 104 and 105. The traveller then begins to tilt in the opposite direction and about this time the jaws 129 are freed to permit them to spring into engagement with the upper edge of the sensitized sheet held by the roller 104 and 105. About the same time, the gripping jaws engage the plates 104 and move the rollers 105 away from the rollers 104 so that the traveller may still further move the sensitized sheet into the developing bath 103 and hold it in this position until the next exposure and next operation of the machine.

It has been found that with this invention, the usual air bubble spots on the prints are eliminated. This is believed to be due to the fact that as one sheet of sensitized material is being fed into the developing bath, another sheet of sensitized material is being fed from the developing bath, so that they agitate the water and cause all air bubbles in the water to be broken up or destroyed.

What I claim as my invention and desire to secure by Letters Patent is:

1. In a photographic apparatus, the combination with an exposure chamber having an exposure position for a sheet of sensitized material, of means for supporting a roll of sensitized sheet material, means for feeding the sensitized material from the roll to the exposure position, severing means for the sensitized material situated between the exposure position and the roll and common operating means for the feeding means and the severing means having connection with the severing means for causing the operation of the severing means prior to the feeding operation of the feeding means.

2. In a photographic apparatus, the combination with an exposure chamber having an exposure position for a sheet of sensitized material, of means for supporting a roll of sensitized sheet material, means for feeding the sensitized sheet material from the roll to exposure position, means for severing the sheet material at a point between the exposure position and the roll, a feeding mechanism automatically gripping the severed piece to move it from exposure position and common operating means for the severing means and the two feeding means having connection with the severing means to cause the latter to sever the sheet prior to the operation of the first mentioned feeding means.

3. In a photographic apparatus, the combination with an exposure chamber having an exposure position for a sheet of sensitized material, of means for supporting a roll of sensitized sheet material to be fed to exposure position, severing means arranged to act upon the sheet material between the roll and the exposure position, two feeding mechanisms, one arranged to feed the sheet material from the roll to exposure position and the other arranged to receive the sheet material from the first named feeding mechanism and to move the exposed portion independently of the first named mechanism after the severing means has severed the said portion from the roll and common operating means for the severing means and the two feeding means having connection with the severing means to cause the latter to sever the sheet before the two feeding means operate, and having connection with the second mentioned feeding means to move the sheet after such severing slightly in advance of the portion of the sheet being fed by the first mentioned feeding mechanism.

4. In a photographic apparatus, the combination with an exposure chamber having an exposure position for a sheet of sensitized material, of means for supporting a sheet of sensitized sheet material, means for feeding the sensitized sheet material from a roll to exposure position, means for severing the sheet of material at a point between exposure position and the roll, feeding mechanism cooperating with the severed piece to move it from exposure position, and common operating mechanism for the severing means and the two feeding means having connection with the severing means for operating the latter to cut off the exposed portion of the sheet before the two feeding means operate, and means for rendering the first named feeding means inoperative for a short period after the severing operation takes place so that the second named feeding means may advance the severed piece ahead of the sheet material attached to the roll.

5. In a photographic apparatus, the combination with an exposure chamber, of means for supporting a roll of sensitized sheet material, guiding means for supporting the sensitized sheet material at exposure position, two pairs of feeding rollers, one arranged at one end of the guiding means for feeding the sheet material from the roll to the guiding means, and the other pair being arranged at the other end of the guiding means for feeding a severed piece from exposure position, and common operating means for the two pairs of feeding rollers and the severing means, having connection with the severing means for operating the latter prior to the feeding action of the two pairs of feeding rollers.

6. In a photographic apparatus, the combination with an exposure chamber having an exposure position for a sheet of sensitized material, of means for supporting a roll of sensitized sheet material within said chamber, means for feeding the sheet material from the roll to exposure position, means for severing an exposed portion of the sheet from the roll while the exposed portion is in exposure position, means providing a developing and a fixing bath in said exposure chamber, means for feeding the sensitized sheet from exposure position to the developing bath, means for feeding the sensitized sheet from the developing bath to the fixing bath and common operating means for the three feeding means and the severing mechanism, connected to the severing mechanism to cause the operation of the latter prior to the operation of the first named feeding means, connected with the second named feeding means to cause the severed sheet to be moved through the developing bath, and connected with the third feeding means for causing the previously exposed sheet in the developing bath to be carried to the fixing bath.

7. In a photographic apparatus, the combination with an exposure chamber having exposure position for a sheet of sensitized material, of means for supporting a roll of sensitized sheet material, means for feeding the sheet material from the roll to exposure position, means for severing from the roll pieces moved to exposure position and before it is moved away from exposed position, a developing bath, two feeding mechanisms operating on the severed pieces to move severed sheets from exposure position to the developing bath, one of said feeding mechanisms being arranged to engage the sensitized material while it is at exposure position and before it has been severed from the roll and the other of said feeding mechanisms being arranged to hold the severed sensitized sheet while it is being moved into the developing bath, a fixing bath, means for moving the sensitized sheet from the developing bath to the fixing bath, said means being engaged with a sensitized sheet while the latter is held by the last mentioned feeding mechanism.

8. In a photographic apparatus, the combination with an exposure chamber having exposure position for a sheet of sensitized material, of means for supporting a roll of sensitized sheet material, means for feeding the sheet material from the roll to exposure position, means for severing from the roll pieces moved to exposure position and before it is moved away from exposure position, a developing bath, two feeding mechanisms operating on the severed pieces to move the severed pieces from exposure position to the developing bath, one of said feeding mechanisms being arranged to engage the sensitized material while it is at exposure position and before it has been severed from the roll and the other of said feeding mechanisms being arranged to hold the severed sensitized sheet while it is being moved into the developing bath, a fixing bath, and means for moving the sensitized sheet from the developing bath to the fixing bath, said means being engaged with a sensitized sheet while the latter is held by the last mentioned feeding mechanism, and means operated by the transfer means for effecting the release of the sensitized sheet from the last mentioned feeding means.

9. In a photographic apparatus, the combination with an exposure chamber having an exposure position for a sheet of sensitized material, a developing bath, a fixing bath, two feeding mechanisms arranged on the same side of the exposure position for moving a sheet from exposure position into the developing bath one of which cooperates with the sheet while it is at exposure position and the other of which cooperates with a sheet while it is in the developing bath, and a transfer mechanism engaging a sheet while held by the last named mechanism and moving such sheet to the fixing bath.

10. In a photographic apparatus, the combination with an exposure chamber having exposure position for a sheet of sensitized material, a developing bath, a fixing bath, two pairs of feeding rollers arranged on one side of the exposure position, one pair of which cooperates with the sheet material while it is at exposure position and the other pair of which cooperates with the sheet material while it is in the developing bath, a transfer mechanism arranged on the same side of the exposure position as the two pairs of feeding rollers and having gripping means for engaging a sheet while it is held by the last mentioned pair of rollers, said transfer mechanism being movable to carry the sheet from the developing bath to the fixing bath.

11. In a photographic apparatus, the combination with an exposure chamber having exposure position for a sheet of sensitized material, a developing bath, a fixing bath, two pairs of feeding rollers, one pair of which cooperates with the sheet material while it is at exposure position and the other pair of which cooperates with the sheet material while it is in the developing bath, a transfer mechanism having gripping means for engaging a sheet while it is held by the last mentioned pair of rollers, said transfer mechanism being movable to carry the sheet from the developing bath to the fixing bath, and means for separating the last mentioned pair of rollers after the sheet has been engaged by the gripping means to permit the sheet to be removed from the rollers by the gripping means.

12. In a photographic apparatus, the combination with an exposure chamber having exposure position for a sheet of sensitized material, a developing bath, a fixing bath, two pairs of feeding rollers for engaging opposite edges of the sheet at exposure position to move said sheet away from exposure position, another two pair of feeding rollers for engaging opposite edges of the sheet and to hold said sheet while it is situated in the developing bath, one member of each pair of the last named two pair of rollers being yieldably supported so as to move away from their cooperating rollers, and a transfer mechanism movable between the last named two pair of rollers to engage the sheet held by such roller, and to effect the movement of the yieldingly mounted rollers to release the sheet and carry such sheet to the fixing bath.

13. In a photographic apparatus, the combination with an exposure chamber having exposure position for a sheet of sensitized material, of a developing bath, a fixing bath, means for feeding the sheet from exposure position to the developing bath comprising two pair of feeding rollers for holding a sheet with a portion thereof in the developing bath, each pair engaging the sheet at one end of the latter, a common shaft on which one roller of each pair is mounted, yielding supports for said shaft, and means for feeding the sheet from the developing bath to the fixing bath having means for engaging the sheet while it is held by said feed rollers and also provision for shifting the shaft on which two of the feed rollers are mounted so that the sheet is freed from the feed rollers prior to being transferred to the fixing bath.

14. In a photographic apparatus, the combination with an exposure chamber having an exposure position, of means for moving a strip of sensitized material to exposure position, means for severing a piece of the sensitized sheet material from said strip while the piece is at exposure position, a developing bath, a feeding means for moving the severed piece from exposure position to the developing bath, a fixing bath, and a transfer means for moving the severed sheet from the developing bath to the fixing bath, said transfer means engaging the sheet while it is being held by the feeding means.

15. In a photographic apparatus, the combination with a developing bath and a fixing bath, of spaced feeding devices for feeding a sensitized sheet into the developing bath, and a transfer means for moving the sensitized sheet from the developing bath to the fixing bath, said transfer means operating between the spaced feeding devices taking hold of the sensitized sheet while the latter is being held by the feeding devices.

16. In a photographic apparatus, the combination with an exposure chamber having exposure position, of a developing bath, a fixing bath, mechanism for moving a strip of sensitized material to exposure position, mechanism for severing the exposed portion from the strip while it is situated at exposure position, mechanism for feeding the severed portion to the developing bath from exposure position, mechanism for feeding the severed piece from the developing bath to the fixing bath, and a common operating means for the hereinbefore mentioned mechanisms.

17. In a photographic apparatus, the combination with an exposure chamber having an exposure position, of mechanism for moving a strip of sensitized material to exposure position arranged on one side of the exposure position, severing mechanism arranged on the same side of the exposure position for severing the exposed portion of the strip, mechanism arranged on the other side of the exposure position for feeding the severed portion of the strip, and means for rendering the first mentioned strip feeding mechanism inoperative while the second severing mechanism is operating and also during a period of the movement of the severed piece so that the severed piece may be advanced ahead of the strip.

18. In a photographic apparatus, the combination with an exposure chamber having an exposure position, feeding mechanism arranged above exposure position for feeding a sensitized strip to exposure position, a developing bath arranged below the exposure position, and severing mechanism for the sensitized sheet arranged above exposure position for severing an exposed portion from the strip while such exposed portion is at exposure position, means automatically gripping the sheet as it is fed to exposure position for feeding the sheet to the developing bath, common means for operating the severing means, the mechanism for feeding the sensitized sheet to exposure position, and the means for gripping the exposed sheet and feeding the same to the developing bath.

19. In a photographic apparatus, the combination with a developing bath and a fixing bath, a pair of feeding rollers for feeding the sensitized sheet into the developing bath, and a transfer means for moving the sensitized sheet from the developing bath to the fixing bath, said transfer means taking hold of the sensitized sheet while it is being moved by the rollers, and being connected with the rollers to effect the separation of the rollers in order that the sheet may be freed from said roller.

20. In a photographic apparatus, the combination with a developing bath and a fixing bath, of a transfer means for moving a sensitized sheet from the developing bath to the fixing bath comprising a trackway, a transfer member mounted to slide and to rock on said trackway, gripping means carried by said transfer member to one side of the axis of turning of the transfer member, an operating member mounted to slide and to rock upon the transfer member, two arms pivotally connected, one of said arms being rigid with the transfer member and the other being rigid with the operating member, a second trackway, means at the pivot between the arms moving on the second trackway, means for effecting the reciprocation of the operating member on the trackway and through the two arms effecting the reciprocation of the transfer member on the trackway, and means at one end of the second trackway for effecting the shifting of the pivot between the two arms so as to effect the rocking of the transfer member in order that the gripping means may engage a sensitized sheet and remove it from the developing bath so as to carry it to the fixing bath.

21. In a photographic apparatus, the combination with a casing formed in the exposure chamber and having an opening in one wall thereof, a carriage movable into and out of said chamber through said opening, a developing bath receptacle mounted on said carriage, and means for effecting the elevation of said receptacle on the carriage as the latter is moved into the exposure chamber and the lowering of said receptacle on the carriage as the latter is moved from the exposure chamber.

22. In a photographic apparatus, the combination with a casing formed with an exposure chamber and having an opening in one wall thereof, a carriage slidable into and out of said chamber through said opening, a tray support, U shaped hangers having their arms pivoted to the carriage and pivotally connected with the tray support between the arms, a developing tray supported on said support, and a stop for cooperating with said support as the latter reaches its inner position to effect the movement of the support to an elevated position on the carriage.

23. In a photographic apparatus, the combination with an exposure chamber having an exposure position for a sheet of sensitized material, of means for feeding a sheet to exposure position arranged on one side of the exposure position, a severing means arranged on the same side of the exposure position, a developing bath, a fixing bath, means for feeding a sheet from exposure position into the developing bath arranged on the other side of the exposure position, means for feeding a sheet from the developing bath to the fixing bath, and a common operator having connection with the severing means and the three feeding means to cause them to operate simultaneously in order that the sheet may be severed and three pieces may be moved together.

24. In a photographic apparatus, the combination with an exposure chamber having an exposure position for the sensitized material, of a developing tray and a fixing tray arranged one above the other, the upper tray having its rear end in advance of the rear end of the lower one, and both trays projecting forwardly from the exposure position and having their intake portions at their rear ends.

25. In a photographic apparatus, the combination with an exposure chamber having an exposure position for the sensitized material, of means for supporting a roll of film with its axis above and in front of the exposure plane, and a developing tray having an intake portion arranged beneath the exposure position and having the main portion of the tray lying in front of such exposure plane.

26. In a photographic apparatus, the combination with an exposure chamber having an exposure position for a sheet of sensitized material, means for supporting a roll of sensitized material to be fed to exposure position, means for severing the sheet of sensitized material between the roll and the exposure position, a developing bath, means for feeding a severed sheet from the exposure position to the developing bath, and means for removing the sheet from the developing bath engaging that edge of the sheet which has immediately prior thereto been formed by the severing mechanism.

27. In a photographic apparatus, the combination with an exposure chamber having an exposure position for a sheet of sensitized material, means for supporting a roll of sensitized material to be fed to exposure position, means for severing the sheet of sensitized material between the roll and the exposure position, a developing bath, a fixing bath, means for feeding a severed sheet from the exposure position to the developing bath, a transfer member, gripping means carried by the transfer member for engaging that edge of the sheet which has immediately prior thereto been formed by the severing mechanism, means for effecting the closing of the gripping means on the sensitized sheet being fed to the developing bath by the feeding means so that the transfer member may remove such sheet from the developing bath and convey it to the fixing bath, and means for effecting the opening of the gripping means after the sensitized sheet has been carried to the fixing bath.

28. In a photographic apparatus, the combination with an exposure position for a sheet of sensitized material, means for supporting a roll of sensitized material to be fed to exposure position, means for severing the sheet of sensitized material between the roll and the exposure position, a developing bath, a fixing bath, means for feeding a severed sheet from the exposure position to the developing bath, and transfer mechanism for moving the sensitized sheet from the developing bath to the fixing bath, comprising a transfer member, a way on which said transfer member slides and rocks, gripping means carried by the transfer member, means for effecting the reciprocation of the transfer member to cause it to travel from the feeding means to the fixing bath, said mechanism effecting the rocking of the transfer member in order that the gripping means may operate upon the sensitized sheet while the latter is being moved by the feeding means into the developing bath, means for effecting the closing of the gripping means on the sensitized sheet while the latter is being moved by the feeding means, and means for effecting the release of the sensitized sheet by the gripping means after the latter has carried the sensitized sheet into the fixing bath.

29. In a photographic apparatus, the combination with an exposure chamber having an exposure position for a sheet of sensitized material, means for supporting a roll of sensitized material to be fed to exposure position, means for severing the sheet of sensitized material between the roll and the exposure position, a developing bath, a fixing bath, means for feeding a severed sheet from exposure position to the developing bath, and transfer mechanism for moving a sensitized sheet from the developing bath to the fixing bath, a reciprocatory transfer member having a fixed gripping jaw thereon, a movable gripping jaw on the transfer member, a spring acting on a movable jaw to hold the latter in gripping relation with the fixed gripping jaw, a cam for cooperating with the movable gripping jaw to effect the movement of the latter to open position as the transfer member approaches a sheet in the developing bath, a cam for cooperating with the movable jaw to effect the movement of the latter away from the fixed jaw after the sheet has been carried into the fixing bath, and means for effecting rocking movement of the transfer member to cause the two jaws to engage the sheet in the developing bath.

30. In a photographic apparatus, the combination with an exposure chamber having an exposure position for a sheet of sensitized material, means for supporting a roll of sensitized material to be fed to exposure position, means for severing the sheet of sensitized material between the roll and the exposure position, a developing bath, a fixing bath, means for feeding a severed sheet from the exposure position to the developing bath, transfer mechanism having gripping means for gripping the sheet at one edge thereof to draw the sheet into the fixing bath, for moving the sheet from the developing bath to the fixing bath, and a submerger for the sensitized sheet in the fixing bath carried by said transfer mechanism in advance of the gripping means when the latter is being drawn into the fixing bath by the gripping means.

GEORGE L. TAYLOR.